United States Patent
Reza et al.

(10) Patent No.: US 12,517,872 B2
(45) Date of Patent: Jan. 6, 2026

(54) TECHNIQUES FOR BLOCK-ORDER TRAVERSAL OF FILES

(71) Applicant: Rubrik, Inc., Palo Alto, CA (US)

(72) Inventors: Abdullah Reza, Pleasanton, CA (US); Arjun Sinha, Mountain View, CA (US); Ishaan Sang, Mountain View, CA (US); Guilherme Vale Ferreira Menezes, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/638,475

(22) Filed: Apr. 17, 2024

(65) Prior Publication Data

US 2025/0328501 A1  Oct. 23, 2025

(51) Int. Cl.
*G06F 16/18* (2019.01)
*G06F 16/11* (2019.01)
*G06F 16/14* (2019.01)

(52) U.S. Cl.
CPC ........ *G06F 16/1815* (2019.01); *G06F 16/128* (2019.01); *G06F 16/148* (2019.01)

(58) Field of Classification Search
CPC ... G06F 16/1815; G06F 16/128; G06F 16/148
USPC ....................................................... 707/822
See application file for complete search history.

(56) References Cited

U.S. PATENT DOCUMENTS

| | | | | |
|---|---|---|---|---|
| 6,374,232 B1* | 4/2002 | Dageville | ........... | G06F 16/2246 |
| 8,099,572 B1* | 1/2012 | Arora | ...................... | G06F 13/28 |
| | | | | 711/E12.013 |
| 8,205,049 B1* | 6/2012 | Armangau | ............... | G06F 13/28 |
| | | | | 711/E12.103 |
| 8,510,524 B1* | 8/2013 | Corbett | ................. | G06F 16/128 |
| | | | | 711/112 |
| 8,533,410 B1* | 9/2013 | Corbett | ................... | G06F 12/00 |
| | | | | 707/637 |
| 8,719,286 B1* | 5/2014 | Xing | ................... | G06F 11/1451 |
| | | | | 707/755 |
| 9,110,792 B1* | 8/2015 | Douglis | .............. | G06F 12/0269 |
| 9,424,137 B1* | 8/2016 | Mam | ..................... | G06F 11/1456 |
| 10,241,691 B2* | 3/2019 | Jain | ...................... | G06F 11/1446 |
| 11,113,247 B1* | 9/2021 | Jia | ........................ | G06F 16/1748 |
| 11,347,692 B1* | 5/2022 | McIlroy | .............. | G06F 16/1727 |

(Continued)

FOREIGN PATENT DOCUMENTS

| | | | | |
|---|---|---|---|---|
| CN | 107480150 A | * | 12/2017 | ........... G06F 16/182 |
| WO | WO-2004047078 A2 | * | 6/2004 | .......... G06F 11/1456 |
| WO | WO-2016137524 A1 | * | 9/2016 | ........... G06F 16/128 |

*Primary Examiner* — Phuong Thao Cao
(74) *Attorney, Agent, or Firm* — Holland & Hart LLP

(57) ABSTRACT

Methods, systems, and devices for data management are described. A data management system (DMS) may access a snapshot of a target client object to perform a block-order traversal of a set of files included in the snapshot. The DMS may generate an index file for the set of files based on a metadata associated with the snapshot, the index file including a mapping between a file path for each file and one or more properties of each file. The DMS may then read the set of files included in the snapshot using a sliding window in accordance with the mapping between the file path for each file and the one or more properties of each file, and may determine whether to generate an alert based on reading the set of files included in the snapshot.

20 Claims, 11 Drawing Sheets

(56) References Cited

U.S. PATENT DOCUMENTS

| | | | | |
|---|---|---|---|---|
| 2005/0027748 A1* | 2/2005 | Kisley | ................ | G06F 11/2074 |
| | | | | 714/E11.107 |
| 2008/0008319 A1* | 1/2008 | Poirier | ................ | H04L 9/0891 |
| | | | | 348/E7.056 |
| 2012/0054152 A1* | 3/2012 | Adkins | ............... | G06F 16/2365 |
| | | | | 707/623 |
| 2017/0147446 A1* | 5/2017 | Zhang | ................ | G06F 11/1453 |
| 2019/0114353 A1* | 4/2019 | Harding, Jr. | .......... | G06F 16/254 |
| 2020/0249877 A1* | 8/2020 | McIlroy | ............. | G06F 16/1744 |
| 2021/0342297 A1* | 11/2021 | Gupta | ................... | G06F 16/128 |
| 2023/0350767 A1* | 11/2023 | Reza | .................... | G06F 3/0613 |
| 2024/0362185 A1* | 10/2024 | Bezbaruah | ............. | G06F 16/13 |
| 2025/0036762 A1* | 1/2025 | Nanivadekar | ......... | G06F 21/568 |
| 2025/0238397 A1* | 7/2025 | Apte | .................... | G06F 16/172 |

* cited by examiner

TECHNIQUES FOR BLOCK-ORDER TRAVERSAL OF FILES

FIELD OF TECHNOLOGY

The present disclosure relates generally to data management, including techniques for techniques for block-order traversal of files.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may analyze backed up files to support detection of potential security threats on user files. To analyze user files backed up in the DMS, the software may traverse and read all the user files (or a subset of the files that meets certain criteria such as file type or maximum size of the file). In such cases, the files to be traversed may either be small in size or the system may need to read a small section of the file from the beginning. However, a challenge to read the files backed up in the DMS may be a speed of traversal. In other words, in a DMS supporting a large number of files, it may take a prohibitively long time to scan and read all files. This may be because, when accessing user-level filesystems, the files are discovered in an order which may not reflect the order in which they are laid out physically in an underlying disk. This may lead to suboptimal performance when analyzing backup files and may have a negative impact on customer experience.

One or more aspects of the present disclosure provide techniques for block-order traversal of files in DMS. A DMS may perform a backup of a target database. After backup, the DMS may periodically run an index job for each snapshot or backup that it captures. An index job may create a journal file (e.g., a merged journal file) for the snapshot with relevant patch files, mounts the user-level filesystem on it and then scans the filesystem to discover certain stats of the file (such as, path, size, last modified time, etc.) and the extent map for the file on disk (where the file is located on the merged journal file). As part of the block-order traversal process, once the merged journal file is generated, the DMS may identify a snapshot and the metadata for each file in the snapshot. The DMS may then, using the metadata, generate a reverse map that maps extents (which may be a <offset, size> pair on the merged journal file) to user-level file paths. In addition, the DMS may use the reverse map to read a threshold number of bytes at a time starting from the beginning of the merged journal file. For example, starting from the start of the merged journal file, the DMS may read Y bytes at a time (Y being configurable) and store it in memory. Then, the DMS may use the reverse map to find paths of all the files that have their extents in the Y-bytes memory buffer. Thus, using the block-order traversal of files, the DMS may provide for faster analysis of backup files using limited memory resources.

Figure 1:
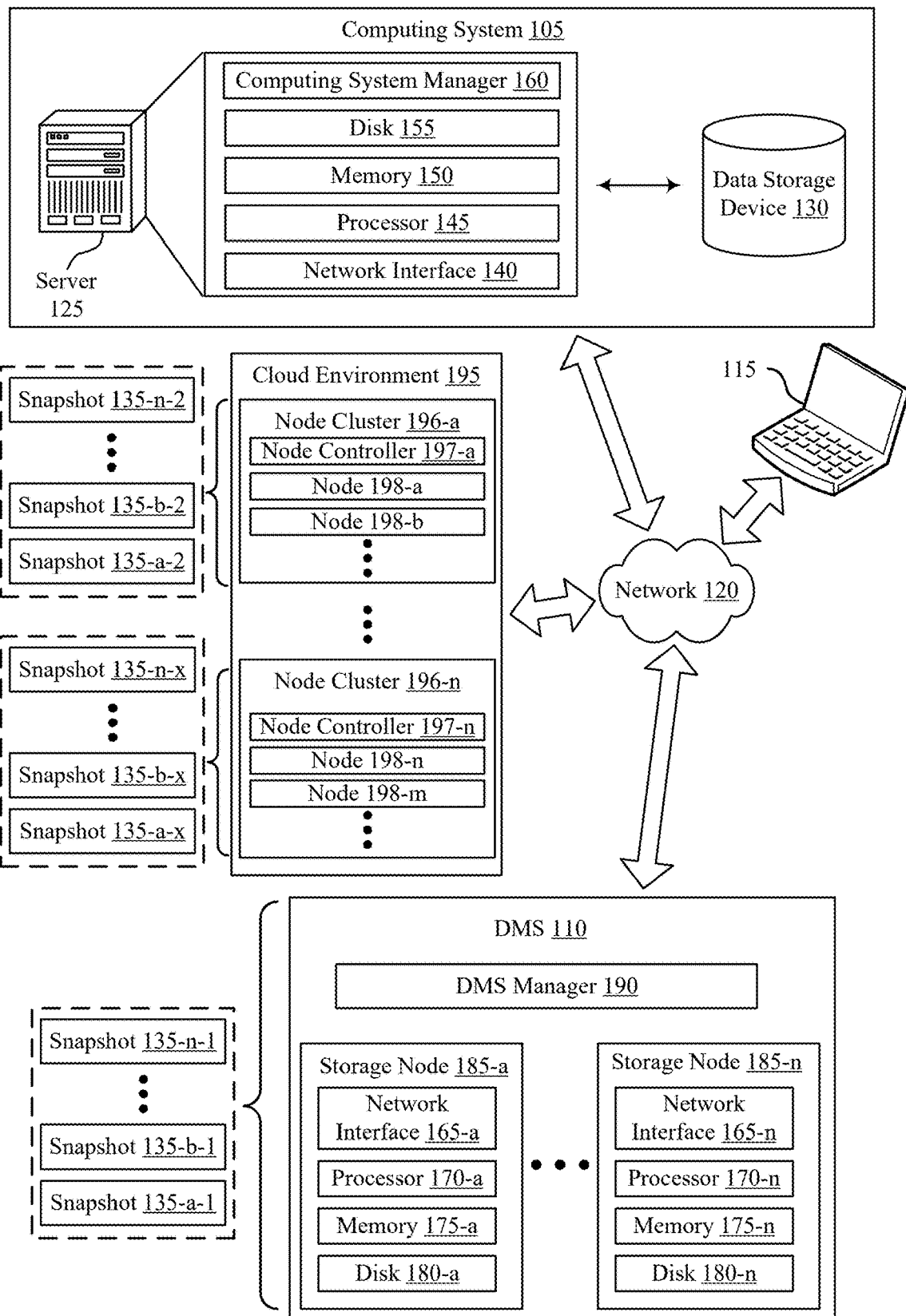
FIG. 1 illustrates an example of a computing environment that supports techniques for block-order traversal of files in accordance with aspects of the present disclosure.

FIG. 1 illustrates an example of a computing environment 100 that supports techniques for block-order traversal of files in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

To analyze user files backed up in a DMS, a software may traverse and read all the user files (or a subset of the files that meets certain criteria, such as file type or maximum size of the file). In these cases, the files that are traversed may either be small in size. Additionally, there may exist a need is to read a small section of the file from the beginning. One category of such use cases may be a security product where contents of all (or a subset of) user files are read in order to detect potential security issues. For instance, a threat detection application may read user files (up to a certain size) to detect and report malicious elements from a backup.

One challenge in such cases may be the speed of traversal. In other words, in a backup environment with many files, it may take prohibitively long time to scan and read all the files. This may be stemmed from user-level filesystems (backed up by the DMS), such as NTFS or ext4. A DMS may discover the files in user-level filesystems in an order which may not reflect the order in which they are actually laid out physically in the underlying disk. In particular, the files may be discovered in name-space or alphabetical order (or some other order such as increasing file size or last access time). They may not be discovered in the order in which they are physically located on the underlying disk. In this context, the filesystem may refer to user data and the underlying disk may refer to the backup system implemented by the DMS. In some examples, a filesystem may return the files in an alphabetical order of their file name. However, they may be stored on disk in a different mixed order, hence the system may fail to read from the disk in sequential order, which may be needed to maximize disk performance. In an example having files with file names "Bar", "Baz" and "Foo", the system may first read the file with name "Bar", then the file "Baz" and then the file "Foo" (alphabetical order). However, they may be laid out on the disk in different order, such as, "Foo", then "Bar" and then "Baz."

Additionally, within a single file, the file may include multiple physical extents and they can be located anywhere in the disk in any order, possibly interleaved with extents of other files, depending on the level of fragmentation. When the file is read via the filesystem, the extents may be read and returned to the reader in the logical offset order, not the order in which they are physically located. In an example, the extents of the files "Foo" and "Bar" may be interleaved. Therefore, if the DMS reads one file at a time, the DMS may go back and forth on the disk causing random input and output. The file "Baz" may not have interleaving with other files but its logical extents may be written in a different order on disk. In this case, if the DMS reads the file from the filesystem, the DMS may read the extents not the same order as they are on disk, resulting in sub-optimal performance.

Due to the way that files are accessed from a filesystem, scanning and reading the files via the filesystem may result in reads from random locations in the disk which may be slow and may impact user experience. Such a technique to file access and reading may result in a long time to finish a single scan. Additionally, the random nature of reads is slow, and may also put heavier input/output load on the system, making other unrelated operations slow. This slowness can further impact user experience if the application runs periodically on all new backups, as opposed to running the application on-demand on certain target backups. Techniques depicted herein provide for scanning and reading files from the user-level filesystem at a higher speed and with reduced randomness at physical disk level.

The methods of the present disclosure provide for discovering physical extent map of files in user-level filesystem backed up by DMS 110 using an indexing technique. Using the extent map described herein, the DMS 110 may implement an algorithm to be able to read files of the filesystem in an order that results in sequential read on the underlying disk. In some examples, the DMS 110 in combination with an application server may access a snapshot of a target client object to perform a block-order traversal of a set of files included in the snapshot. The DMS 110 in combination with the application server may generate an index file for the set of files based on a metadata associated with the snapshot. In some cases, the index file may include a mapping between a file path for each file and one or more properties of each file. The DMS 110 in combination with the application server may implement a sliding-window technique to read the set of files. The sliding window techniques may ensure that nearly all files up to a certain size, or large files where only a small section need to be read, in the filesystem can be read using one sequential scan of the underlying disk from start to finish using a small amount of system memory. In some examples, the DMS 110 in combination with the application server may read the set of files included in the snapshot using a sliding window in accordance with the mapping between the file path for each file and the one or more properties of each file. Additionally, or alternatively, the DMS 110 in combination with the application server may determine whether to generate an alert based on reading the set of files included in the snapshot.

Figure 2:
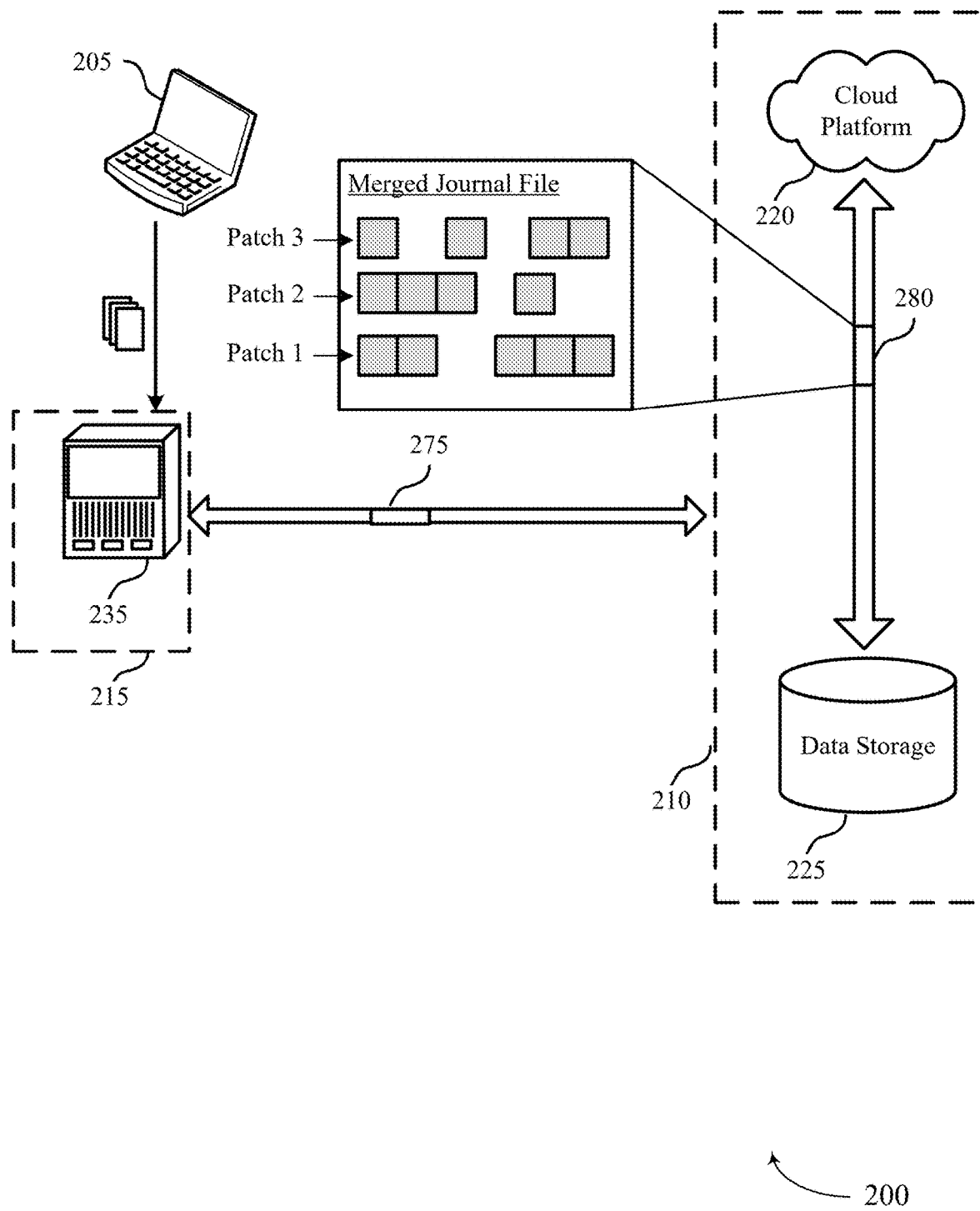
FIG. 2 shows an example of a computing system that supports techniques for block-order traversal of files in accordance with aspects of the present disclosure.

FIG. 2 shows an example of a computing system 200 that supports techniques for block-order traversal of files in accordance with aspects of the present disclosure. The computing system 200 includes a user device 205, a DMS 210 and a data manager 215. The DMS 210 may be or include a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The DMS 210 may include a data storage 225 (e.g., a storage node or a distributed storage node). Although not depicted herein, the DMS 210 may include more than one data storage 225. Multiple data storages 225 (e.g., storage nodes of a distributed storage architecture) may be geographically separated from each other. As depicted in the example of FIG. 2, the DMS 210 may include a cloud platform 220. The cloud platform 220 may offer an on-demand storage and computing services to the user device 205. In some cases, the DMS 210 may be an example of a storage system with built-in data management. The DMS 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of databases running on clustered setups. In some examples, such databases may have instances running across multiple nodes of a cluster (e.g., DMS 210 including a computing cluster). The computing system 200 may face challenges related identifying malicious activity when reading files on a computing device. Aspects depicted herein provide for improved file access on computing systems using a block-order traversal technique.

The techniques depicted herein provide for discovering and reading of files in a way that maximizes the sequential aspect of the reads at a disk level. Reading files sequentially may result in an improved speed of scanning or reading the files for a current application. Additionally, such a technique of file access may reduce input/output load on a system to help other important tasks in the system.

The computing system 200 may implement the block-order traversal of files utilizing a physical extent map produced by an index job. The DMS 210 in combination with the data manager 215 may back up one or more files from the user device 205. Such back up may be in a snapshot format. The DMS 210 in combination with the data manager 215 may access a snapshot 275 a target client object (included in the user device 205) to perform a block-order traversal of a set of files included in the snapshot. First, the application server 235 may run an index job on one or more snapshots of the target client object (user device 205). The application server 235 may then create a journal file 280 (e.g., merged journal file) for the snapshot of the target client object using one or more patch files based on running the index job. In particular, the index job may produce a list of physical extent on disk for each user file. With this extent map, the DMS 210 in combination with the data manager 215 may scan a disk from start to finish and, using the extent map produced by the index job, and may then feed the application the files in an order that results in sequential read for most of the files in the filesystem.

As depicted herein, the computing system 200 may use a sparse representation to store data for a snapshot. This may be referred to as a patch file. A patch file (e.g., patch 1, patch 2, and patch 3) for a snapshot may include data blocks that have changed since the last snapshot was captured. To generate a complete logical view of a snapshot, all patch files are to be considered, in order, from all previous snapshots up to the snapshot in question. Since patch files are sparse and incremental with respect to the last snapshot, the computing system 200 may use the merged journal file 280 to generate a logical view of a snapshot. In some examples, the merged journal file 280 may give the merged view of an entire patch file chain related to a snapshot or backup. In some examples, users may be able see the same logical address space that they backed up via the merged journal file 280 and may issue a read operation to the merged journal file 280 for any range. In some examples, the merged journal file 280 may implement a logic to check each patch file, starting from the most recent, for the data range, and return the most recent version of the logical block. In this example, for creating a snapshot corresponding to patch 3, the computing system 200 may create the merged journal file 280 with all the patch files from that and the previous snapshots.

In some examples, the merged journal file 280 may represent block-level data that is backed up by the DMS 210. In some examples, the merged journal file 280 may include a filesystem from a client. For example, for a VMware virtual machine (VM) backup, the merged journal file 280 may represent a virtual machine disk (VMDK) with some user-specific filesystem, such as New Technology File System (NTFS). To read files from the backup, the application server 235 may mount the filesystem on top of the merged journal file 280 so that files can be seen and restored. For instance, the application server 235 may mount a user file system using the journal file and may scan the user file system to identify one or more properties of each file. In this example, the merged journal file 280 may operate as a block device supporting the user-level filesystem. The application server 235 may then write the one or more properties of each file to the index file for the set of files included in a snapshot. Once the index file is generated, the application server 235 may read the set of files using a sliding window technique.

According to one or more aspects depicted herein, the computing system may read a merged journal file once from start to finish sequentially and let the client/user of the filesystem (e.g. NTFS) read their files without any additional out-of-order reads from the merged journal file. One challenge is that if a filesystem is extremely fragmented, the computing system may encounter a situation where the first extent of a file is at the beginning of the merged journal file while the next extent of that file is at the very end of the merged journal file. In such cases, it may not be possible to read one file with one sequential scan of the merged journal file without reading and storing the first extent of the file in memory (since there can be a large number of extents from a large number of other files in the filesystem which may also be read, and these extents may be between the extents of the file in question). However, filesystems that have this level of fragmentation are rare and for some use cases (e.g. security applications that scans files for threats and anomalies) the computing system may only read small-sized files that do not exceed certain sizes or may read a small portion of the file from the beginning of the file. Thus, the computing system may operate according to a sliding-window scheme where it is able to read most (if not all) small files (or small portions of large files).

The aspects depicted herein provide techniques to read user-level files (that meets certain requirements) from a filesystem such that the actual input/outputs issued to a merged journal file form a sequential pattern. Such a technique leads to sequential reads on disk that backs up the merged journal file, and may result in faster speed and low disk utilization. Additionally, in order to ensure that all files are read sequentially, the system may use a prohibitively large amount of system memory (since there may be a hold up of previous extents of a file in memory until the next extent, which can be at the end of the disk, is discovered). Therefore, the sliding-window scheme described herein ensures a sequential read for nearly all files that are scanned, given that the files are either small in size (the maximum size is configurable) or the system only reads a small section of the file from its beginning.

Figure 3:
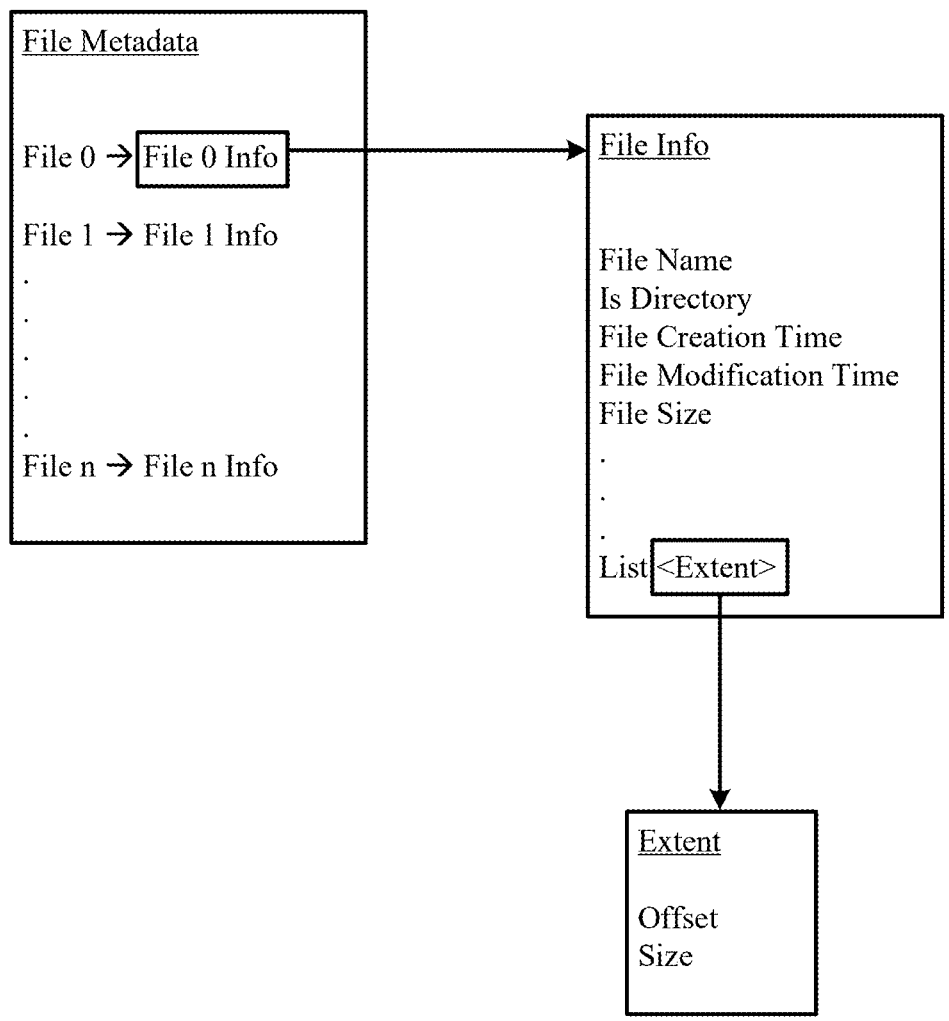
FIG. 3 shows an example of a metadata that supports techniques for block-order traversal of files in accordance with aspects of the present disclosure.

FIG. 3 shows an example of a metadata 300 that supports techniques for block-order traversal of files in accordance with aspects of the present disclosure. A computing system (e.g., computing system 200) may run an index job for each snapshot or backup that it takes. An index job may create a merged journal file (e.g., merged journal file 280 described with reference to FIG. 2) for the snapshot, using relevant patch files. In some examples, the index job may then be used to mount a user-level filesystem (e.g. NTFS) on merged journal file and scan the filesystem to discover certain statistics of the file (such as, path, size, last modified time). As depicted in the example of FIG. 3, the index job may generate a file metadata including one or more properties associated with one or more files. The one or more properties may include at least one of a file name, a file directory information, a file creation time, a file modification time, a file size, an extent map of one or more file blocks included in a disk, or any combination thereof. The extent map for the file on disk (the disk being the merged journal file in this case) may include an offset information and size information. The per-file information may be stored in a special key-value store file called FilesystemMetaData (FMD). In some examples, the FMD (or metadata 300) may be used to let users browse their backed up filesystem without accessing backup data. The per-file extent map stored in FMD may also allow traversing and reading of files in an order that results in sequential reads from the merged journal file (by extension from the actual physical disk).

Figure 4:
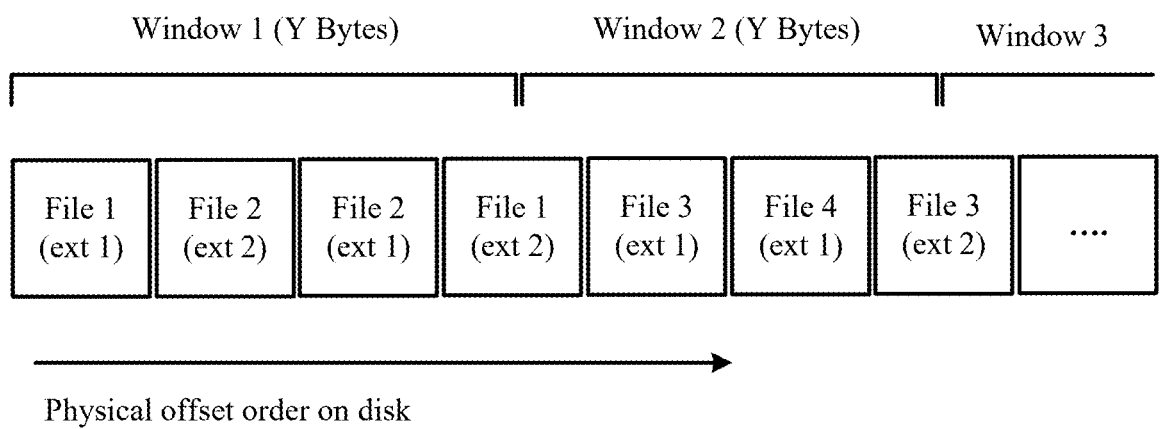
FIG. 4 shows an example of a file access technique that supports techniques for block-order traversal of files in accordance with aspects of the present disclosure.

FIG. 4 shows an example of a file access technique 400 that supports techniques for block-order traversal of files in accordance with aspects of the present disclosure. A computing system (e.g., an application server in combination with a DMS) may implement the file access technique 400 to read a set of files included in a snapshot using a sliding window in accordance with a mapping between a file path for each file and one or more properties of each file. As depicted herein, the computing system (e.g., an application server in combination with a DMS) may access a merged journal file (e.g., merged journal file 280 as described with reference to FIG. 2).

According to one or more aspects depicted herein, the application server may read a merged journal file once from start to finish sequentially according to a sliding window technique. The application server may read the filesystem with one sequential scan of a merged journal file from start to end which greatly improves the overall speed and reduces random input/output load on the system, due to the sequential nature of input and output on the underlying disk.

As depicted in the example of FIG. 4, the application server may read all files in a filesystem with maximum size of X bytes with minimum amount of non-sequential reads on disk. The filesystem may represent one snapshot (e.g. backup) of an object. That is, the application server may access a user-level filesystem (e.g. NTFS) that is mounted on a merged journal file that represents the snapshot. For the snapshot, the application server may identify the file metadata 300 (that maps files to their extent list on merged journal file).

From the file metadata, the application server may generate a reverse map that maps extents (which may be a <offset,size> pair on the merged journal file) to user-level file paths, sorted by offset field of the extents. Starting from the start of the merged journal file, the application server may read Y bytes at a time (Y being configurable) and store it in memory. For example, the application server may read a threshold number of bytes corresponding to a subset of files of a set of files from a snapshot starting from a start of a journal file, where the threshold number of bytes is configured by a user. Then, the application server use the reverse map to find paths of all the files that have all their extents (or all the extents that the application wants to read, since it may intend to read only a small portion of the file from the beginning of the file) in the Y-bytes memory buffer. For example, the application server may identify a path corresponding to each file of the subset of files from the index file for the set of files, where the subset of files have extents included in a memory buffer. Then it may read these paths and may support these reads from the memory buffer of Y bytes (no disk read for this). The application server may then read the path corresponding to each file of the subset of files from the memory buffer and store the threshold number of bytes in a memory buffer. In some cases, a size of the memory buffer may correspond to twice the threshold number of bytes. This technique may operate with a memory buffer of Y bytes and Y may be referred to the size of the "window" in the sliding window scheme. To be able to handle the situation where a file's extent(s) are at the boundary of two windows, the computing system may maintain two Y-bytes consecutive windows in memory. Hence, the memory usage for this scheme is 2Y.

As depicted in the example of FIG. 4, the application server may read File 1 (ext 1), File 2 (ext 2), File 2 (ext 1) and portion of File 1 (ext 2) during the first sliding window (Window 1). In particular, the application server may start from the beginning of the merged journal file and read Y bytes at a time (called a window) into memory. The first window (Window 1) may include all extents of File 2. However, Window 1 may partially include the second extent for File 1. After reading the first window, the method may read File 1, making sure that the read is satisfied from the in-memory buffer for Window 1. The application server may then read the upcoming windows (Window 2) in memory (the system may keep Window 1 in memory until Window 3 is being read). As depicted in the example of FIG. 4, the Window 2 may include the rest of the second extent of File 1, and the system may allow the read of File 1 by client (which may be served by in-memory buffers of Window 1 and Window 2). In this example, the first extent of File 3 is included in Window 2 but the second extent is partially included in Window 2. In this case, the system may not let the client (reading job implemented by the application server) read File 3 (File 3 may be allowed to be read only Window 3 is loaded in memory). Additionally, File 4's first extent is included in Window-3. If File 4 has another extent (a file may have a extents in a heavily-fragmented file system, if the file is large in size) and if that extent is located in Window 4 or later, then the sliding-window scheme may not work on this file, as it may not be completely located within two consecutive windows. However, if a client was interested to read only the first X bytes of each file and the first extent of File 4 is already greater than or equal to X bytes, then the sliding window scheme will be able to satisfy the read of this file. Additionally, if the sliding-window scheme is not able to handle a file, it may flag the file, and the client may read it via the filesystem directly.

During the techniques depicted herein, the application server may detect and identify the path of files that could not be read since all their extents (or the first few extents that the application wants to read) were not found in two successive windows. Once the process finishes, the application server may read these files via the filesystem directly. Since these files, if any, are very small in number compared to all the files in the system, their impact on performance and input/output load is negligible. As depicted herein, the window size (Y) may be configurable and be chosen to produce a favorable outcome for the application associated with the snapshot. For example, if the application is directed at reading only files that are no larger than 10 MB or no more than first 10 MB of any file, then Y may be configured to be at least 10 MB and a value of 50 MB for Y may be enough to produce the desirable outcome in a system with reasonable levels of filesystem fragmentation. In this example, the memory requirement is small for modern systems with large memory capacities.

Figure 5:
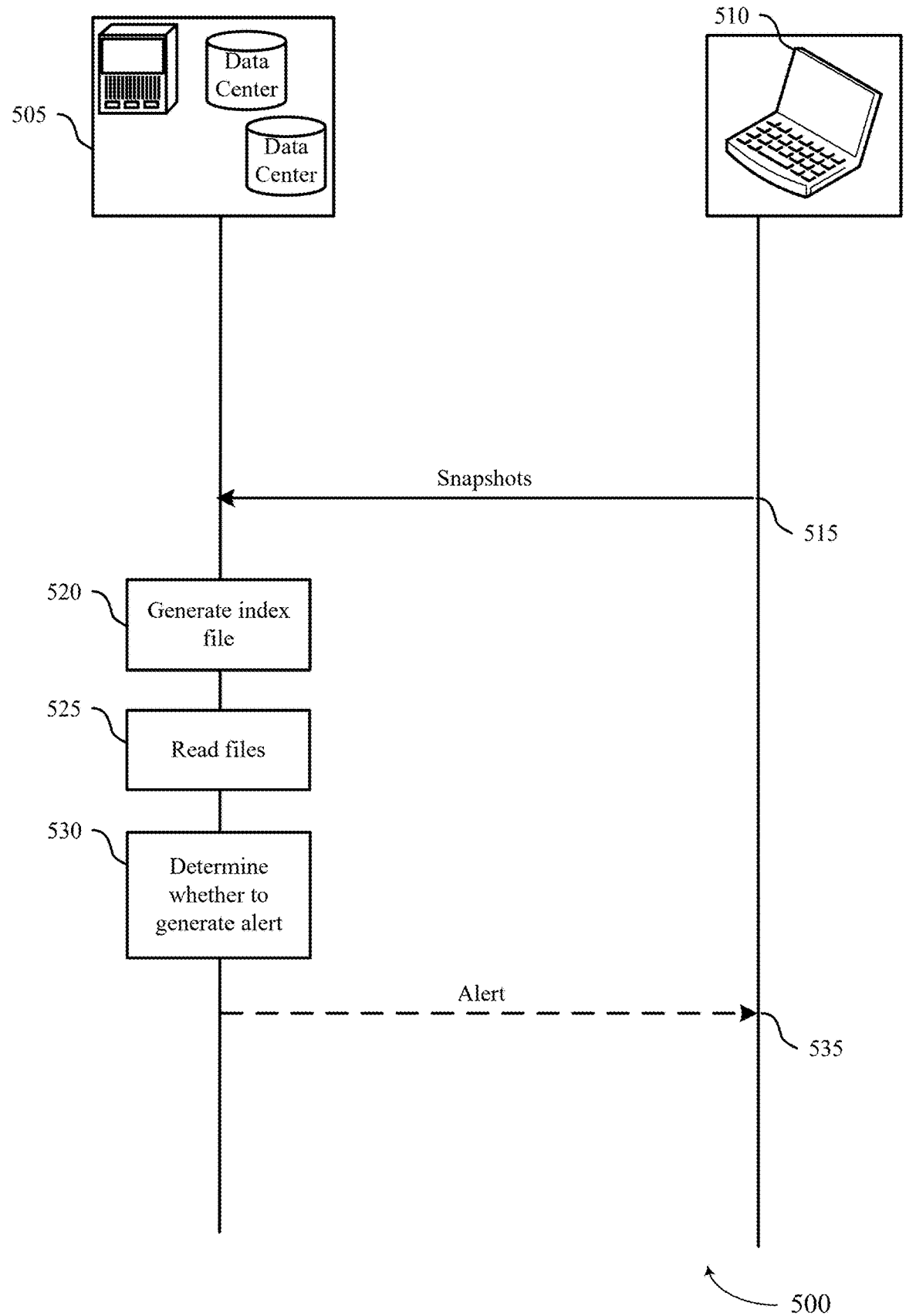
FIG. 5 shows an example of a process flow that supports techniques for block-order traversal of files in accordance with aspects of the present disclosure.

FIG. 5 shows an example of a process flow 500 that supports techniques for block-order traversal of files in accordance with aspects of the present disclosure. The process flow 500 includes a DMS 505 and a user device 410. The DMS 505 may include an application server, one or more data storages (e.g., multiple data centers of a computing cluster) as described with respect to FIGS. 2, 3 and 4. The user device 510 may be an example of a user device as described with respect to FIGS. 2, 3, and 4. Although a single entity is depicted as DMS 505, it may be understood that components of the DMS 505 may be located in different locations.

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the DMS 505 may receive or otherwise access a snapshot of a target client object to perform a block-order traversal of a set of files included in the snapshot. At 520, the DMS 505 may generate an index file for the set of files based on a metadata associated with the snapshot. In some cases, the index file may include a mapping between a file path for each file and one or more properties of each file.

At 525, the DMS 505 may read the set of files included in the snapshot using a sliding window in accordance with the mapping between the file path for each file and the one or more properties of each file. At 530, the DMS 505 may determine whether to generate an alert based on reading the set of files included in the snapshot. At 535, the DMS 505 may optionally generate an alert, where the alert indicates detection of a potential security threat on the set of files.

Figure 6:
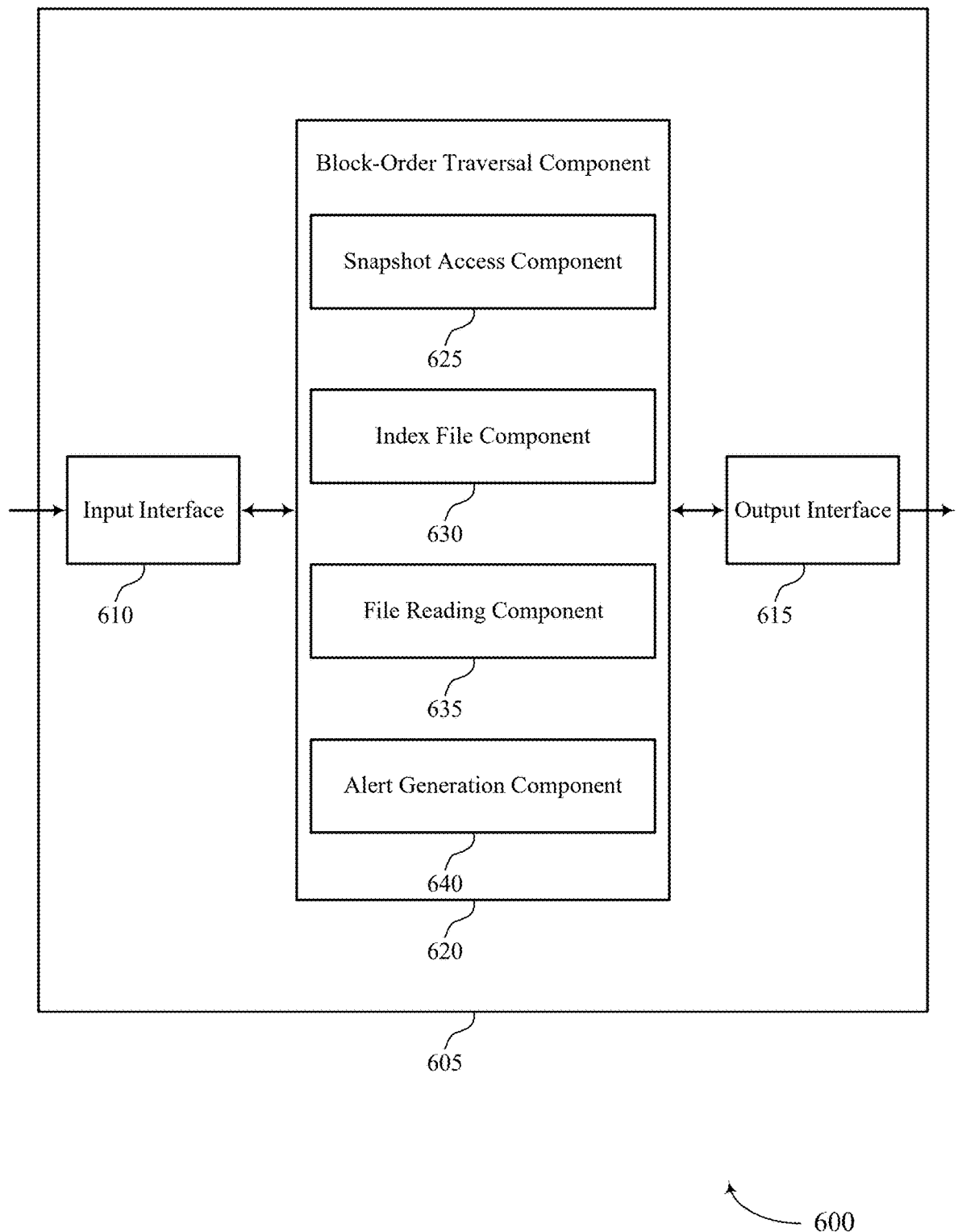
FIG. 6 shows a block diagram of an apparatus that supports techniques for block-order traversal of files in accordance with aspects of the present disclosure.

FIG. 6 shows a block diagram 600 of a system 605 that supports techniques for block-order traversal of files in accordance with aspects of the present disclosure. In some examples, the system 605 may be an example of aspects of one or more components described with reference to FIG. 1, such as a DMS 110. The system 605 may include an input interface 610, an output interface 615, and a block-order traversal component 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the block-order traversal component 620 to support techniques for block-order traversal of files. In some cases, the input interface 610 may be a component of a network interface 825 as described with reference to FIG. 8.

The output interface 615 may manage output signaling for the system 605. For example, the output interface 615 may receive signaling from other components of the system 605, such as the block-order traversal component 620, and may transmit such output signaling corresponding to (e.g., representative of or otherwise based on) such signaling to other systems or devices. In some cases, the output interface 615 may be a component of a network interface 825 as described with reference to FIG. 8.

For example, the block-order traversal component 620 may include a snapshot access component 625, an index file component 630, a file reading component 635, an alert generation component 640, or any combination thereof. In some examples, the block-order traversal component 620, or various components thereof, may be configured to perform various operations (e.g., receiving, monitoring, transmitting) using or otherwise in cooperation with the input interface 610, the output interface 615, or both. For example, the block-order traversal component 620 may receive information from the input interface 610, send information to the output interface 615, or be integrated in combination with the input interface 610, the output interface 615, or both to receive information, transmit information, or perform various other operations as described herein.

The snapshot access component 625 may be configured as or otherwise support a means for accessing a snapshot of a target client object to perform a block-order traversal of a set of multiple files included in the snapshot. The index file component 630 may be configured as or otherwise support a means for generating an index file for the set of multiple files based on a metadata associated with the snapshot, the index file including a mapping between a file path for each file and one or more properties of each file. The file reading component 635 may be configured as or otherwise support a means for reading the set of multiple files included in the snapshot using a sliding window in accordance with the mapping between the file path for each file and the one or more properties of each file. The alert generation component 640 may be configured as or otherwise support a means for determining whether to generate an alert based on reading the set of multiple files included in the snapshot.

Figure 7:
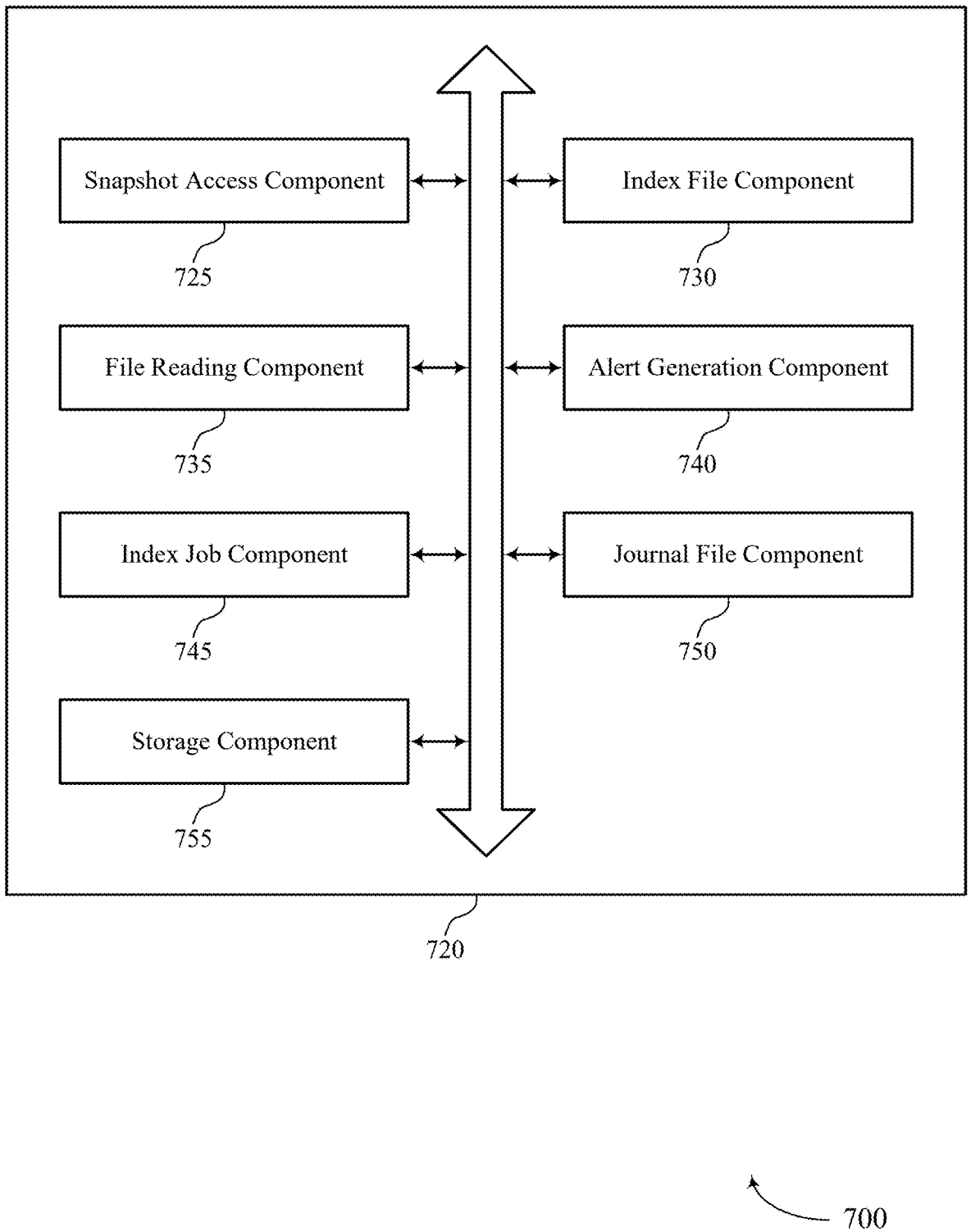
FIG. 7 shows a block diagram of a block-order traversal component that supports techniques for block-order traversal of files in accordance with aspects of the present disclosure.

FIG. 7 shows a block diagram 700 of a block-order traversal component 720 that supports techniques for block-order traversal of files in accordance with aspects of the present disclosure. The block-order traversal component 720 may be an example of aspects of a block-order traversal component 620, or both, as described herein. The block-order traversal component 720, or various components thereof, may be an example of means for performing various aspects of techniques for block-order traversal of files as described herein. For example, the block-order traversal component 720 may include a snapshot access component 725, an index file component 730, a file reading component 735, an alert generation component 740, an index job component 745, a journal file component 750, a storage component 755, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot access component 725 may be configured as or otherwise support a means for accessing a snapshot of a target client object to perform a block-order traversal of a set of multiple files included in the snapshot. The index file component 730 may be configured as or otherwise support a means for generating an index file for the set of multiple files based on a metadata associated with the snapshot, the index file including a mapping between a file path for each file and one or more properties of each file. The file reading component 735 may be configured as or otherwise support a means for reading the set of multiple files included in the snapshot using a sliding window in accordance with the mapping between the file path for each file and the one or more properties of each file. The alert generation component 740 may be configured as or otherwise support a means for determining whether to generate an alert based on reading the set of multiple files included in the snapshot.

In some examples, the index job component 745 may be configured as or otherwise support a means for running an index job on one or more snapshots of the target client object. In some examples, the journal file component 750 may be configured as or otherwise support a means for creating a journal file for the snapshot of the target client object using one or more patch files based on running the index job. In some examples, the journal file component 750 may be configured as or otherwise support a means for mounting a user file system using the journal file and scanning the user file system to identify the one or more properties of each file. In some examples, the index file component 730 may be configured as or otherwise support a means for writing the one or more properties of each file to the index file for the set of multiple files.

In some examples, to support reading the set of multiple files, the file reading component 735 may be configured as or otherwise support a means for reading a threshold number of bytes corresponding to a subset of files of the set of multiple files from the snapshot starting from a start of a journal file, where the threshold number of bytes is configured by a user.

In some examples, the file reading component 735 may be configured as or otherwise support a means for identifying a path corresponding to each file of the subset of files from the index file for the set of multiple files, where the subset of files have extents included in a memory buffer. In some examples, the file reading component 735 may be configured as or otherwise support a means for reading the path corresponding to each file of the subset of files from the memory buffer.

In some examples, the storage component 755 may be configured as or otherwise support a means for storing the threshold number of bytes in a memory buffer, where a size of the memory buffer corresponds to twice the threshold number of bytes. In some examples, a size of the sliding window includes the threshold number of bytes.

In some examples, the file reading component 735 may be configured as or otherwise support a means for determining that at least one file cannot be read using the sliding window in accordance with the mapping between the file path for each file and the one or more properties of each file. In some examples, the file reading component 735 may be configured as or otherwise support a means for reading the at least one file from a file system based on determining that the at least one file cannot be read using the sliding window.

In some examples, the one or more properties include at least one of a file name, a file directory information, a file creation time, a file modification time, a file size, an extent map of one or more file blocks included in a disk, or any combination thereof. In some examples, the alert indicates detection of a potential security threat on the set of multiple files.

Figure 8:
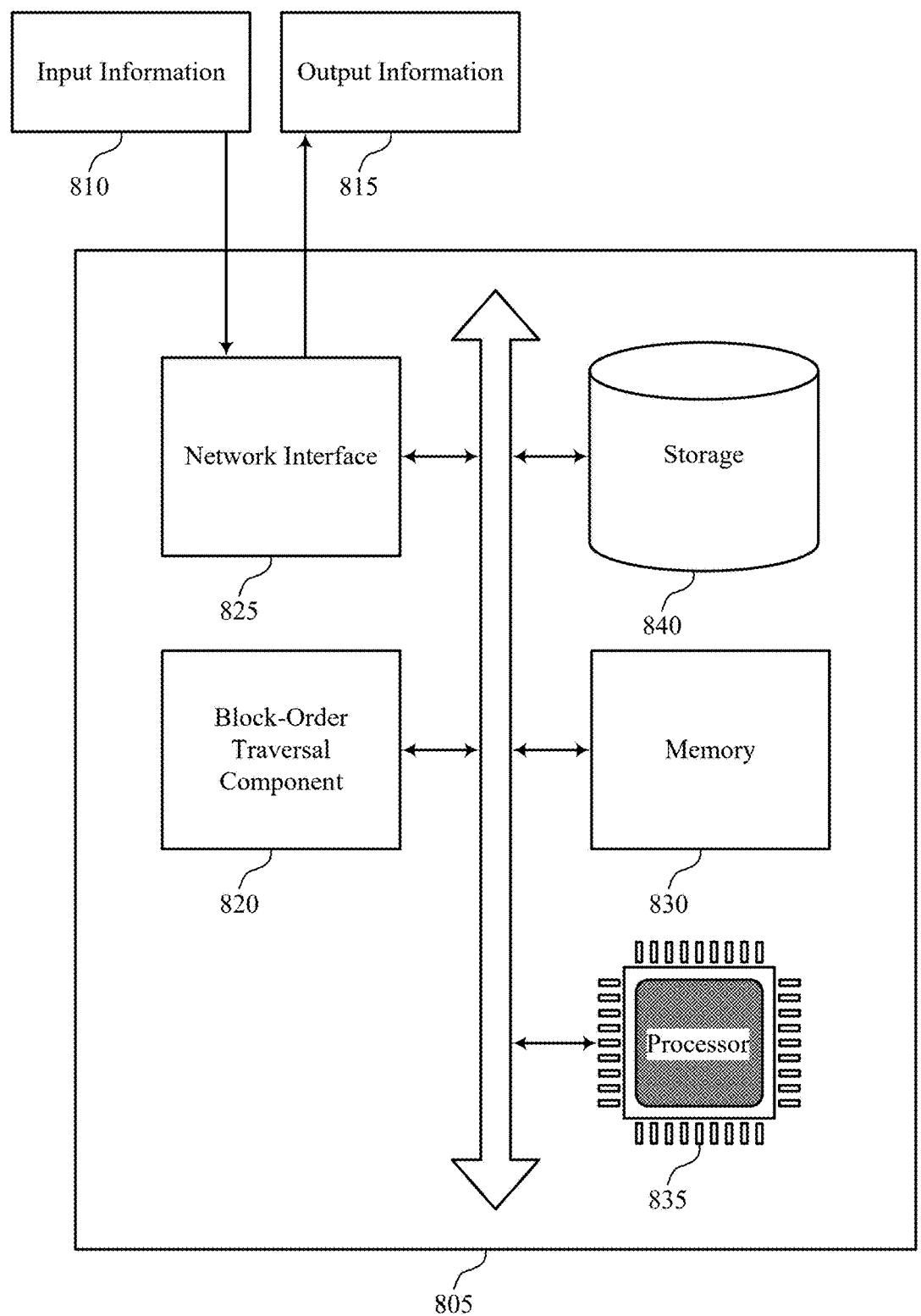
FIG. 8 shows a diagram of a system including a device that supports techniques for block-order traversal of files in accordance with aspects of the present disclosure.

FIG. 8 shows a block diagram 800 of a system 805 that supports techniques for block-order traversal of files in accordance with aspects of the present disclosure. The system 805 may be an example of or include components of a system 605 as described herein. The system 805 may include components for data management, including components such as a block-order traversal component 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting techniques for block-order traversal of files). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the block-order traversal component 820 may be configured as or otherwise support a means for accessing a snapshot of a target client object to perform a block-order traversal of a set of multiple files included in the snapshot. The block-order traversal component 820 may be configured as or otherwise support a means for generating an index file for the set of multiple files based on a metadata associated with the snapshot, the index file including a mapping between a file path for each file and one or more properties of each file. The block-order traversal component 820 may be configured as or otherwise support a means for reading the set of multiple files included in the snapshot using a sliding window in accordance with the mapping between the file path for each file and the one or more properties of each file. The block-order traversal component 820 may be configured as or otherwise support a means for determining whether to generate an alert based on reading the set of multiple files included in the snapshot.

By including or configuring the block-order traversal component 820 in accordance with examples as described herein, the system 805 may support techniques for techniques for block-order traversal of files, which may provide one or more benefits such as, for example, improved reliability, reduced latency, and improved user experience, among other possibilities.

Figure 9:
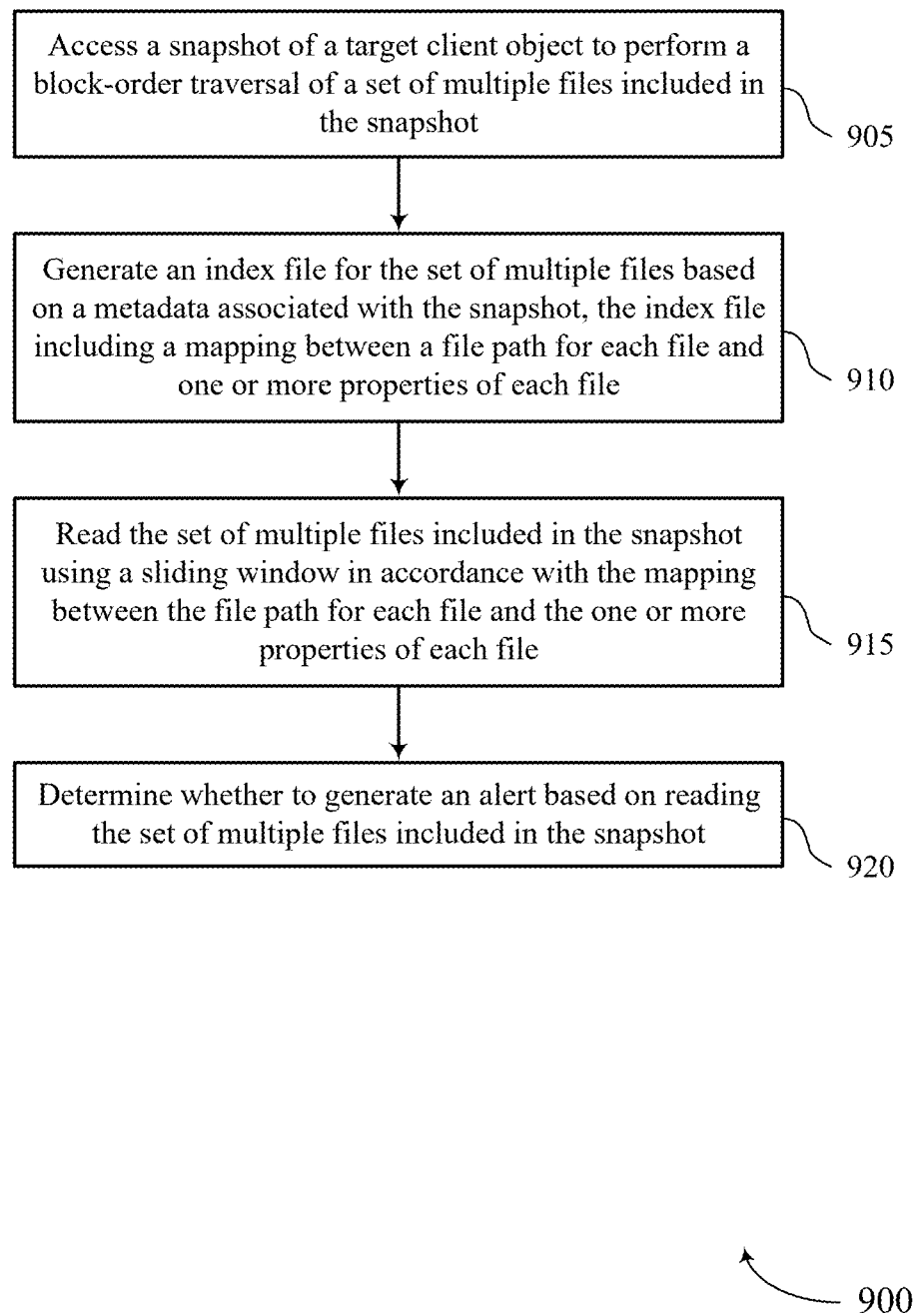
FIGS. 9 through 11 show flowcharts illustrating methods that support techniques for block-order traversal of files in accordance with aspects of the present disclosure.

FIG. 9 shows a flowchart illustrating a method 900 that supports techniques for block-order traversal of files in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include accessing a snapshot of a target client object to perform a block-order traversal of a set of multiple files included in the snapshot. The operations of 905 may be performed in accordance with examples as disclosed herein. In some examples, aspects of the operations of 905 may be performed by a snapshot access component 725 as described with reference to FIG. 7.

At 910, the method may include generating an index file for the set of multiple files based on a metadata associated with the snapshot, the index file including a mapping between a file path for each file and one or more properties of each file. The operations of 910 may be performed in accordance with examples as disclosed herein. In some examples, aspects of the operations of 910 may be performed by an index file component 730 as described with reference to FIG. 7.

At 915, the method may include reading the set of multiple files included in the snapshot using a sliding window in accordance with the mapping between the file path for each file and the one or more properties of each file. The operations of 915 may be performed in accordance with examples as disclosed herein. In some examples, aspects of the operations of 915 may be performed by a file reading component 735 as described with reference to FIG. 7.

At 920, the method may include determining whether to generate an alert based on reading the set of multiple files included in the snapshot. The operations of 920 may be performed in accordance with examples as disclosed herein. In some examples, aspects of the operations of 920 may be performed by an alert generation component 740 as described with reference to FIG. 7.

Figure 10:
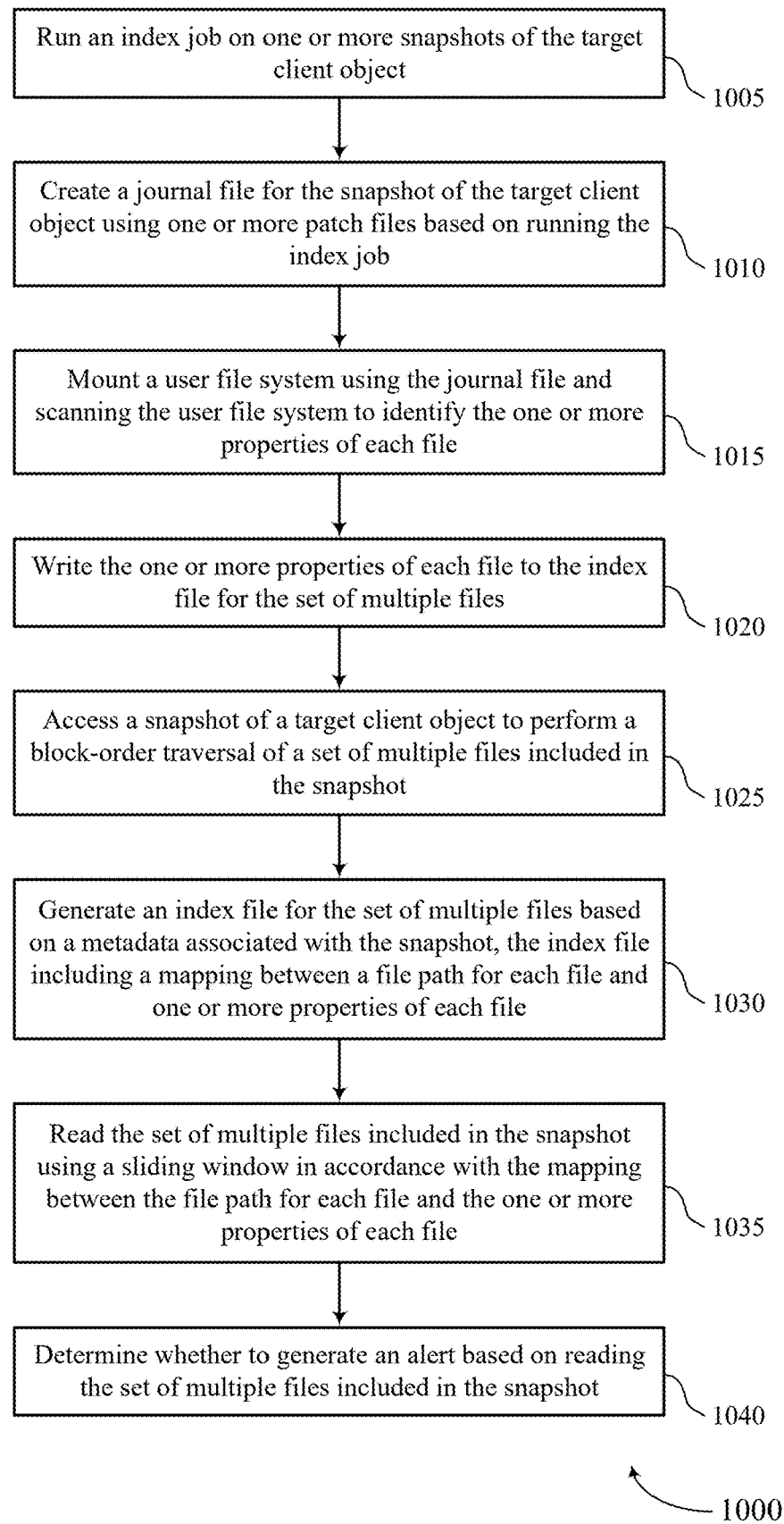

FIG. 10 shows a flowchart illustrating a method 1000 that supports techniques for block-order traversal of files in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include running an index job on one or more snapshots of the target client object. The operations of 1005 may be performed in accordance with examples as disclosed herein. In some examples, aspects of the operations of 1005 may be performed by an index job component 745 as described with reference to FIG. 7.

At 1010, the method may include creating a journal file for the snapshot of the target client object using one or more patch files based on running the index job. The operations of 1010 may be performed in accordance with examples as disclosed herein. In some examples, aspects of the operations of 1010 may be performed by a journal file component 750 as described with reference to FIG. 7.

At 1015, the method may include mounting a user file system using the journal file and scanning the user file system to identify the one or more properties of each file. The operations of 1015 may be performed in accordance with examples as disclosed herein. In some examples, aspects of the operations of 1015 may be performed by a journal file component 750 as described with reference to FIG. 7.

At 1020, the method may include writing the one or more properties of each file to the index file for the set of multiple files. The operations of 1020 may be performed in accordance with examples as disclosed herein. In some examples, aspects of the operations of 1020 may be performed by an index file component 730 as described with reference to FIG. 7.

At 1025, the method may include accessing a snapshot of a target client object to perform a block-order traversal of a set of multiple files included in the snapshot. The operations of 1025 may be performed in accordance with examples as disclosed herein. In some examples, aspects of the operations of 1025 may be performed by a snapshot access component 725 as described with reference to FIG. 7.

At 1030, the method may include generating an index file for the set of multiple files based on a metadata associated with the snapshot, the index file including a mapping between a file path for each file and one or more properties of each file. The operations of 1030 may be performed in accordance with examples as disclosed herein. In some examples, aspects of the operations of 1030 may be performed by an index file component 730 as described with reference to FIG. 7.

At 1035, the method may include reading the set of multiple files included in the snapshot using a sliding window in accordance with the mapping between the file path for each file and the one or more properties of each file. The operations of 1035 may be performed in accordance with examples as disclosed herein. In some examples, aspects of the operations of 1035 may be performed by a file reading component 735 as described with reference to FIG. 7.

At 1040, the method may include determining whether to generate an alert based on reading the set of multiple files included in the snapshot. The operations of 1040 may be performed in accordance with examples as disclosed herein. In some examples, aspects of the operations of 1040 may be performed by an alert generation component 740 as described with reference to FIG. 7.

Figure 11:
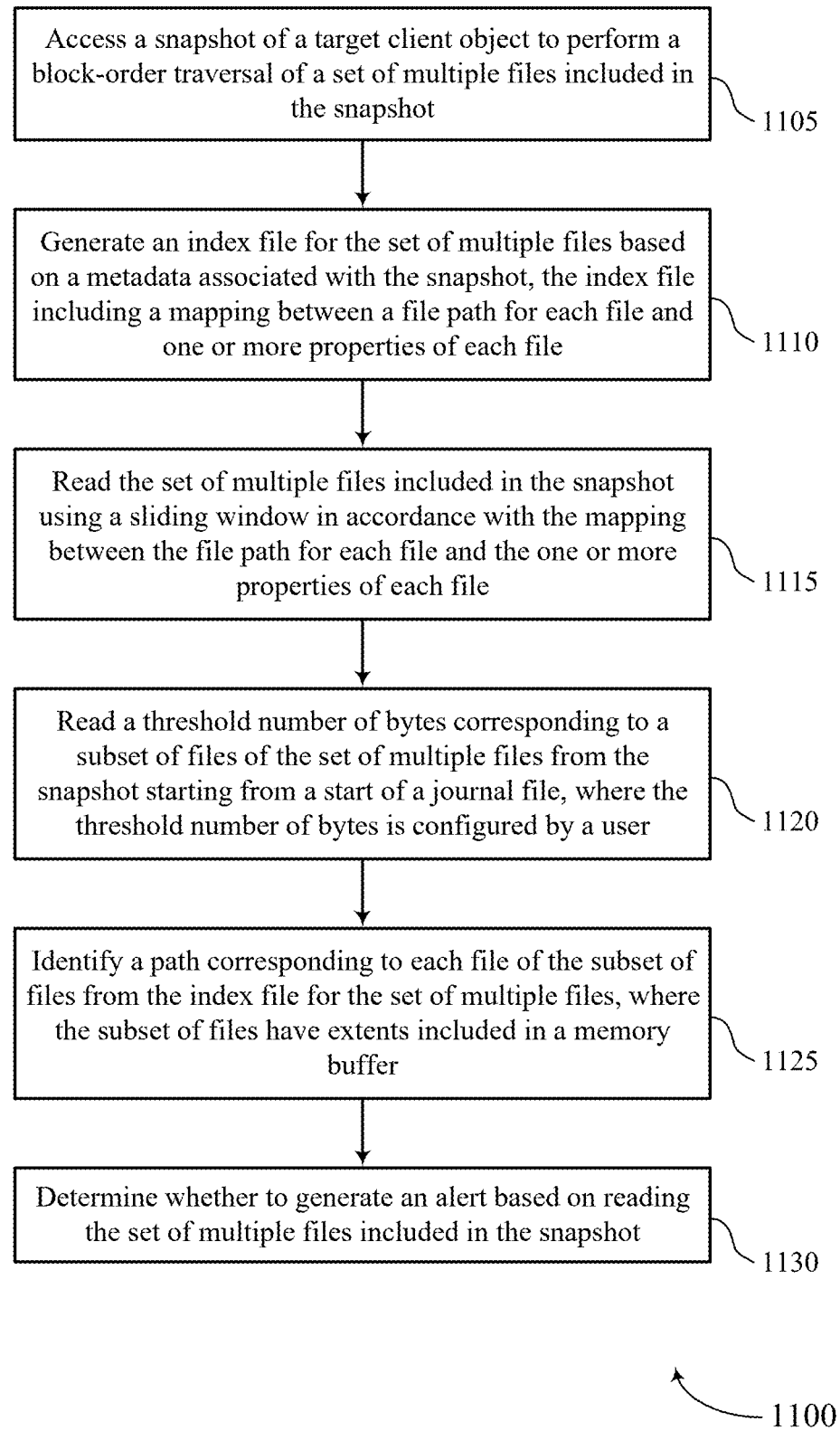

FIG. 11 shows a flowchart illustrating a method 1100 that supports techniques for block-order traversal of files in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include accessing a snapshot of a target client object to perform a block-order traversal of a set of multiple files included in the snapshot. The operations of 1105 may be performed in accordance with examples as disclosed herein. In some examples, aspects of the operations of 1105 may be performed by a snapshot access component 725 as described with reference to FIG. 7.

At 1110, the method may include generating an index file for the set of multiple files based on a metadata associated with the snapshot, the index file including a mapping between a file path for each file and one or more properties of each file. The operations of 1110 may be performed in accordance with examples as disclosed herein. In some examples, aspects of the operations of 1110 may be performed by an index file component 730 as described with reference to FIG. 7.

At 1115, the method may include reading the set of multiple files included in the snapshot using a sliding window in accordance with the mapping between the file path for each file and the one or more properties of each file. The operations of 1115 may be performed in accordance with examples as disclosed herein. In some examples, aspects of the operations of 1115 may be performed by a file reading component 735 as described with reference to FIG. 7.

At 1120, the method may include reading a threshold number of bytes corresponding to a subset of files of the set of multiple files from the snapshot starting from a start of a journal file, where the threshold number of bytes is configured by a user. The operations of 1120 may be performed in accordance with examples as disclosed herein. In some examples, aspects of the operations of 1120 may be performed by a file reading component 735 as described with reference to FIG. 7.

At 1125, the method may include identifying a path corresponding to each file of the subset of files from the index file for the set of multiple files, where the subset of files have extents included in a memory buffer. The operations of 1125 may be performed in accordance with examples as disclosed herein. In some examples, aspects of the operations of 1125 may be performed by a file reading component 735 as described with reference to FIG. 7.

At 1130, the method may include determining whether to generate an alert based on reading the set of multiple files included in the snapshot. The operations of 1130 may be performed in accordance with examples as disclosed herein. In some examples, aspects of the operations of 1130 may be performed by an alert generation component 740 as described with reference to FIG. 7.

A method by an apparatus is described. The method may include accessing a snapshot of a target client object to perform a block-order traversal of a set of multiple files included in the snapshot, generating an index file for the set of multiple files based on a metadata associated with the snapshot, the index file including a mapping between a file path for each file and one or more properties of each file, reading the set of multiple files included in the snapshot using a sliding window in accordance with the mapping between the file path for each file and the one or more properties of each file, and determining whether to generate an alert based on reading the set of multiple files included in the snapshot.

An apparatus is described. The apparatus may include one or more memories storing processor executable code, and one or more processors coupled with the one or more memories. The one or more processors may individually or collectively be operable to execute the code to cause the apparatus to access a snapshot of a target client object to perform a block-order traversal of a set of multiple files included in the snapshot, generate an index file for the set of multiple files based on a metadata associated with the snapshot, the index file including a mapping between a file path for each file and one or more properties of each file, read the set of multiple files included in the snapshot using a sliding window in accordance with the mapping between the file path for each file and the one or more properties of each file, and determine whether to generate an alert based on reading the set of multiple files included in the snapshot.

Another apparatus is described. The apparatus may include means for accessing a snapshot of a target client object to perform a block-order traversal of a set of multiple files included in the snapshot, means for generating an index file for the set of multiple files based on a metadata associated with the snapshot, the index file including a mapping between a file path for each file and one or more properties of each file, means for reading the set of multiple files included in the snapshot using a sliding window in accordance with the mapping between the file path for each file and the one or more properties of each file, and means for determining whether to generate an alert based on reading the set of multiple files included in the snapshot.

A non-transitory computer-readable medium storing code is described. The code may include instructions executable by one or more processors to access a snapshot of a target client object to perform a block-order traversal of a set of multiple files included in the snapshot, generate an index file for the set of multiple files based on a metadata associated with the snapshot, the index file including a mapping between a file path for each file and one or more properties of each file, read the set of multiple files included in the snapshot using a sliding window in accordance with the mapping between the file path for each file and the one or more properties of each file, and determine whether to generate an alert based on reading the set of multiple files included in the snapshot.

Some examples of the method, apparatus, and non-transitory computer-readable medium described herein may further include operations, features, means, or instructions for running an index job on one or more snapshots of the target client object, creating a journal file for the snapshot of the target client object using one or more patch files based on running the index job, mounting a user file system using the journal file and scanning the user file system to identify the one or more properties of each file, and writing the one or more properties of each file to the index file for the set of multiple files.

In some examples of the method, apparatus, and non-transitory computer-readable medium described herein, reading the set of multiple files may include operations, features, means, or instructions for reading a threshold number of bytes corresponding to a subset of files of the set of multiple files from the snapshot starting from a start of a journal file, where the threshold number of bytes may be configured by a user.

Some examples of the method, apparatus, and non-transitory computer-readable medium described herein may further include operations, features, means, or instructions for identifying a path corresponding to each file of the subset of files from the index file for the set of multiple files, where the subset of files may have extents included in a memory buffer.

Some examples of the method, apparatus, and non-transitory computer-readable medium described herein may further include operations, features, means, or instructions for reading the path corresponding to each file of the subset of files from the memory buffer.

Some examples of the method, apparatus, and non-transitory computer-readable medium described herein may further include operations, features, means, or instructions for storing the threshold number of bytes in a memory buffer, where a size of the memory buffer corresponds to twice the threshold number of bytes.

In some examples of the method, apparatus, and non-transitory computer-readable medium described herein, a size of the sliding window includes the threshold number of bytes. Some examples of the method, apparatus, and non-transitory computer-readable medium described herein may further include operations, features, means, or instructions for determining that at least one file cannot be read using the sliding window in accordance with the mapping between the file path for each file and the one or more properties of each file and reading the at least one file from a file system based on determining that the at least one file cannot be read using the sliding window.

In some examples of the method, apparatus, and non-transitory computer-readable medium described herein, the one or more properties include at least one of a file name, a file directory information, a file creation time, a file modification time, a file size, an extent map of one or more file blocks included in a disk, or any combination thereof. In some examples of the method, apparatus, and non-transitory computer-readable medium described herein, the alert indicates detection of a potential security threat on the set of multiple files.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a data management system comprising:
accessing a snapshot of a target client object to perform a block-order traversal of a plurality of files included in the snapshot, wherein the plurality of files are stored to a computing disk of the data management system;
generating an index file for the plurality of files based at least in part on a metadata associated with the snapshot, the index file comprising a mapping between a file path for each file stored to a user-level file system and one or more properties of each file, the one or more properties comprising a physical extent map that maps one or more file blocks to a physical location of each file on the computing disk;
reading, from the computing disk and in accordance with performance of the block-order traversal, a plurality of sequentially-located physical extents for the plurality of files included in the snapshot using a sliding window in accordance with the mapping between the file path for each file and the one or more properties of each file that comprises the physical extent map; and
determining whether to generate an alert based at least in part on reading the plurality of files included in the snapshot.

2. The method of claim 1, further comprising:
running an index job on one or more snapshots of the target client object;
creating a journal file for the snapshot of the target client object using one or more patch files based at least in part on running the index job;
mounting a user file system using the journal file and scanning the user file system to identify the one or more properties of each file;
writing the one or more properties of each file to the index file for the plurality of files; and
reading the journal file sequentially based at least in part on writing the one or more properties of each file to the index file, wherein reading the plurality of sequentially-located physical extents is in accordance with reading the journal file sequentially.

3. The method of claim 1, wherein reading the plurality of files further comprises:
reading a threshold number of bytes corresponding to a subset of files of the plurality of files from the snapshot starting from a start of a journal file, wherein the threshold number of bytes is configured by a user.

4. The method of claim 3, further comprising:
identifying a path corresponding to each file of the subset of files from the index file for the plurality of files, wherein the subset of files have extents included in a memory buffer.

5. The method of claim 4, further comprising:
reading the path corresponding to each file of the subset of files from the memory buffer.

6. The method of claim 3, further comprising:
storing the threshold number of bytes in a memory buffer, wherein a size of the memory buffer corresponds to twice the threshold number of bytes.

7. The method of claim 3, wherein a size of the sliding window comprises the threshold number of bytes.

8. The method of claim 1, further comprising:
determining that at least one file cannot be read using the sliding window in accordance with the mapping between the file path for each file and the one or more properties of each file; and
reading the at least one file from a file system based at least in part on determining that the at least one file cannot be read using the sliding window.

9. The method of claim 1, wherein the one or more properties comprise at least one of a file name, a file directory information, a file creation time, a file modification time, a file size, or any combination thereof.

10. The method of claim 1, wherein the alert indicates detection of a potential security threat on the plurality of files.

11. An apparatus, comprising:
one or more memories storing processor-executable code; and
one or more processors coupled with the one or more memories and individually or collectively operable to execute the code to cause the apparatus to:
access, by a data management system, a snapshot of a target client object to perform a block-order traversal of a plurality of files included in the snapshot, wherein the plurality of files are stored to a computing disk of the data management system;
generate an index file for the plurality of files based at least in part on a metadata associated with the snapshot, the index file comprising a mapping between a file path for each file stored to a user-level file system and one or more properties of each file, the one or more properties comprising a physical extent map that maps one or more file blocks to a physical location of each file on the computing disk;
read, from the computing disk and in accordance with performance of the block-order traversal, a plurality of sequentially-located physical extents for the plurality of files included in the snapshot using a sliding window in accordance with the mapping between the file path for each file and the one or more properties of each file that comprises the physical extent map; and
determine whether to generate an alert based at least in part on reading the plurality of files included in the snapshot.

12. The apparatus of claim 11, wherein the one or more processors are individually or collectively further operable to execute the code to cause the apparatus to:
run an index job on one or more snapshots of the target client object;
create a journal file for the snapshot of the target client object using one or more patch files based at least in part on running the index job;
mount a user file system using the journal file and scanning the user file system to identify the one or more properties of each file;
write the one or more properties of each file to the index file for the plurality of files; and
read the journal file sequentially based at least in part on writing the one or more properties of each file to the index file, wherein reading the plurality of sequentially-located physical extents is in accordance with reading the journal file sequentially.

13. The apparatus of claim 11, wherein, to read the plurality of files, the one or more processors are individually or collectively further operable to execute the code to cause the apparatus to:
read a threshold number of bytes corresponding to a subset of files of the plurality of files from the snapshot starting from a start of a journal file, wherein the threshold number of bytes is configured by a user.

14. The apparatus of claim 13, wherein the one or more processors are individually or collectively further operable to execute the code to cause the apparatus to:

identify a path corresponding to each file of the subset of files from the index file for the plurality of files, wherein the subset of files have extents included in a memory buffer.

15. The apparatus of claim 14, wherein the one or more processors are individually or collectively further operable to execute the code to cause the apparatus to:

read the path corresponding to each file of the subset of files from the memory buffer.

16. The apparatus of claim 13, wherein the one or more processors are individually or collectively further operable to execute the code to cause the apparatus to:

store the threshold number of bytes in a memory buffer, wherein a size of the memory buffer corresponds to twice the threshold number of bytes.

17. The apparatus of claim 13, wherein a size of the sliding window comprises the threshold number of bytes.

18. The apparatus of claim 11, wherein the one or more processors are individually or collectively further operable to execute the code to cause the apparatus to:

determine that at least one file cannot be read using the sliding window in accordance with the mapping between the file path for each file and the one or more properties of each file; and read the at least one file from a file system based at least in part on determining that the at least one file cannot be read using the sliding window.

19. The apparatus of claim 11, wherein the one or more properties comprise at least one of a file name, a file directory information, a file creation time, a file modification time, or any combination thereof.

20. A non-transitory computer-readable medium storing code, the code comprising instructions executable by one or more processors to:

access, by a data management system, a snapshot of a target client object to perform a block-order traversal of a plurality of files included in the snapshot, wherein the plurality of files are stored to a computing disk of the data management system;

generate an index file for the plurality of files based at least in part on a metadata associated with the snapshot, the index file comprising a mapping between a file path for each file stored to a user-level file system and one or more properties of each file, the one or more properties comprising a physical extent map that maps one or more file blocks to a physical location of each file on the computing disk;

read, from the computing disk and in accordance with performance of the block-order traversal, a plurality of sequentially-located physical extents for the plurality of files included in the snapshot using a sliding window in accordance with the mapping between the file path for each file and the one or more properties of each file that comprises the physical extent map; and determine whether to generate an alert based at least in part on reading the plurality of files included in the snapshot.

* * * * *